(12) United States Patent
Chen

(10) Patent No.: US 7,314,062 B2
(45) Date of Patent: Jan. 1, 2008

(54) WATER CONTROL STRUCTURE FOR THE SPOUT OF FAUCETS

(76) Inventor: Chuan-Lung Chen, No. 5, Lane Liau Tsuo, Liau Tsuo Li, Lu Kang Chen, Changhua (TW)

( * ) Notice: Subject to any disclaimer, the term of this patent is extended or adjusted under 35 U.S.C. 154(b) by 473 days.

(21) Appl. No.: 11/008,932

(22) Filed: Dec. 13, 2004

(65) Prior Publication Data

US 2006/0124181 A1   Jun. 15, 2006

(51) Int. Cl.
*F16K 11/074* (2006.01)
(52) U.S. Cl. .................. 137/625.41; 137/801
(58) Field of Classification Search ............. 137/625.4, 137/625.41, 801; 251/340

See application file for complete search history.

(56) References Cited

U.S. PATENT DOCUMENTS 3,410,487 A * 11/1968 Hyde ........................ 239/26
3,726,318 A *  4/1973 Hyde .................... 137/625.41
5,657,791 A *  8/1997 Graber .................. 137/625.41

* cited by examiner

*Primary Examiner*—John Fox
(74) *Attorney, Agent, or Firm*—Troxell Law Office, PLLC

(57) ABSTRACT

A water control structure for the spout of faucets and particularly to a faucet control structure installed on the spout to supply cold and hot water simultaneously. It includes a water control valve assembly fastened to the spout of a faucet. The water control valve assembly has a coupling member to connect to a cold water duct and a hot water duct. A ceramic control valve consisting of a ceramic movable plate and a ceramic anchor plate is provided to control cold and hot water supply according to requirements. Water may be supplied instantly. Operation is easy and cold and hot water may be supplied simultaneously.

7 Claims, 5 Drawing Sheets

WATER CONTROL STRUCTURE FOR THE SPOUT OF FAUCETS

BACKGROUND OF THE INVENTION

1. Field of the Invention

The invention relates to a water control structure for the spout of faucets and particularly a faucet control structure installed on the spout to control supply of cold and hot water simultaneously.

2. Description of the Prior Art

The conventional faucet has a water control valve to control water supply. One of the examples is R.O.C. patent publication No. 443458. It mainly has a connector coupling on the spout of a faucet. The connector has other end connecting to a coupling seat of a control valve assembly. Water flow passes through the discharge tube of the faucet and the connector, enters the control valve assembly and flows out. In such a structure, water flows out through the passage of the faucet and the notch of a valve disk. The valve disk does not have a branch design. Thus the faucet can supply only cold water or hot water, and cannot supply cold water and hot water at the same time. To supply cold water and hot water at the same time, another faucet has to be installed. It is costly and takes more space, and is not economic effective.

SUMMARY OF THE INVENTION

In view of the aforesaid disadvantages, the present invention aims to provide a water control structure for the spout of faucets that includes a water control valve assembly coupled on the spout of a faucet body and fastened by a fastening sleeve. The fastening sleeve is encased in a rotary outer cap to control opening and closing of water supply. The water control valve assembly includes a valve seat, a spindle, a buffer member, a ceramic movable plate, a ceramic anchor plate, a coupling member and a fastening lid. The coupling member has two coupling holes connecting respectively to a cold water duct and a hot water duct. The ceramic movable plate and the ceramic anchor plate jointly form a ceramic control valve to branch water flow. The rotary outer cap and the spindle can be moved together to control water supply amount of cold water and hot water to simultaneously supply cold water and hot water.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
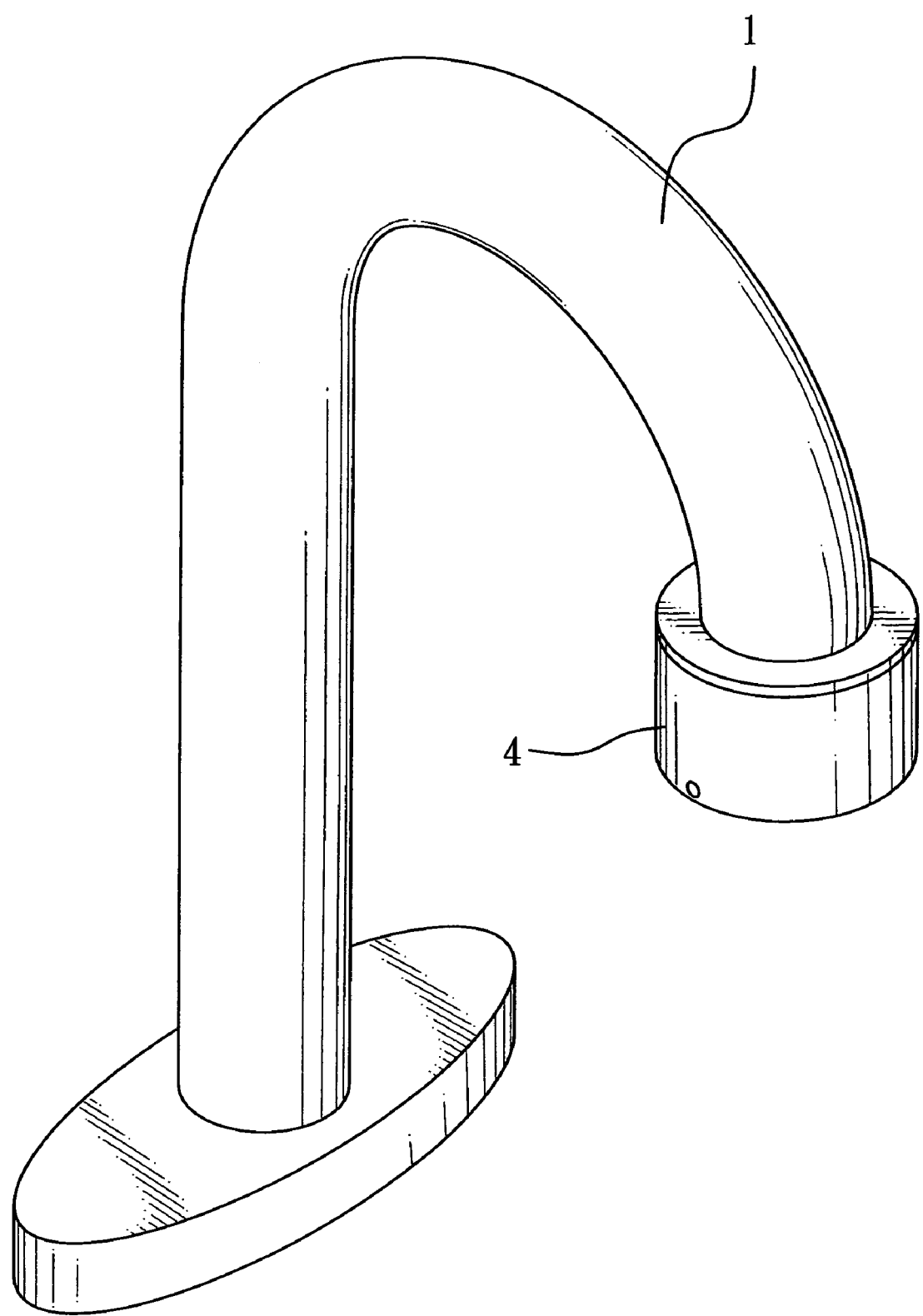
FIG. 1 is a perspective view of the invention.
Figure 2:
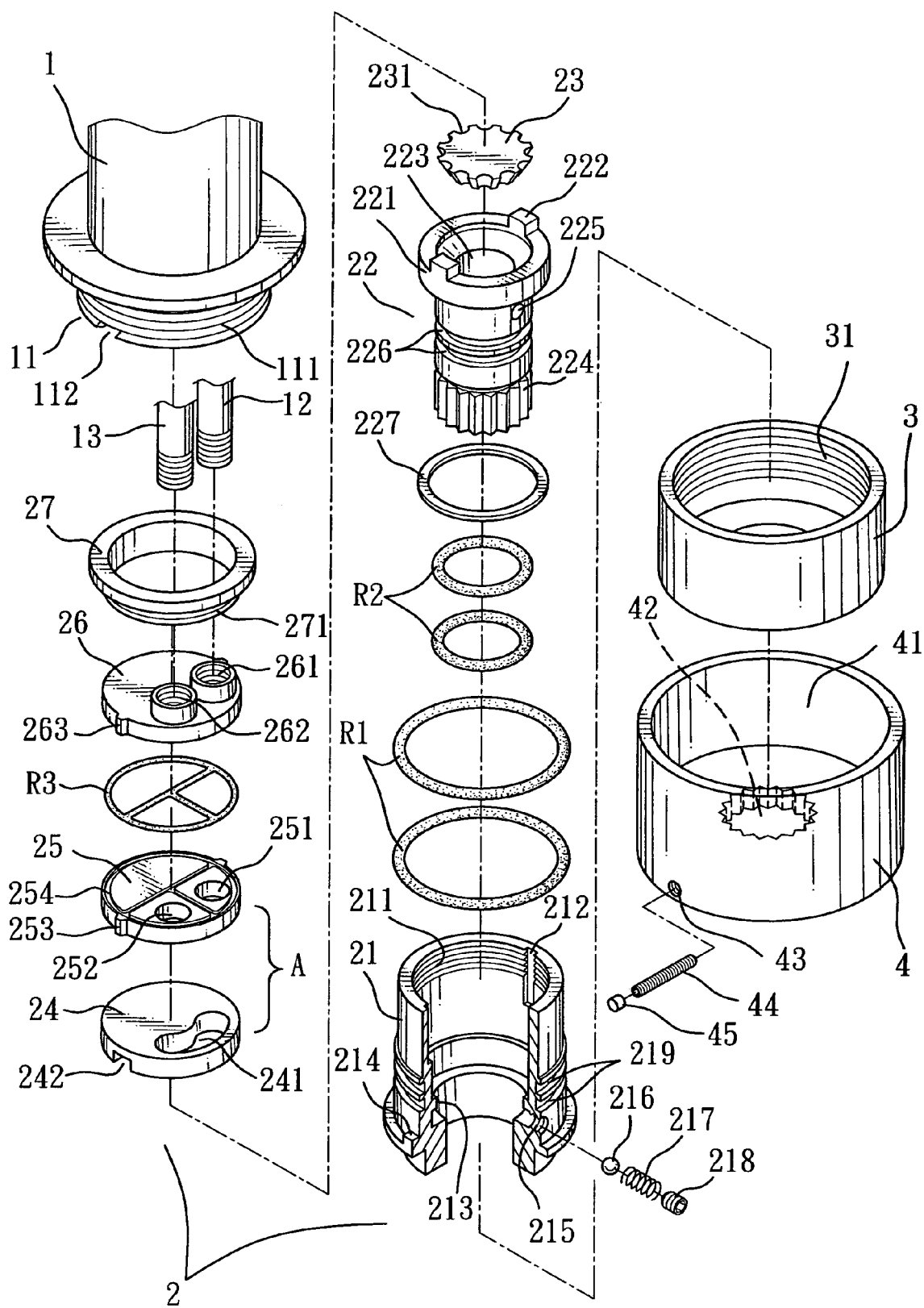
FIG. 2 is an exploded view of the invention.
Figure 3:
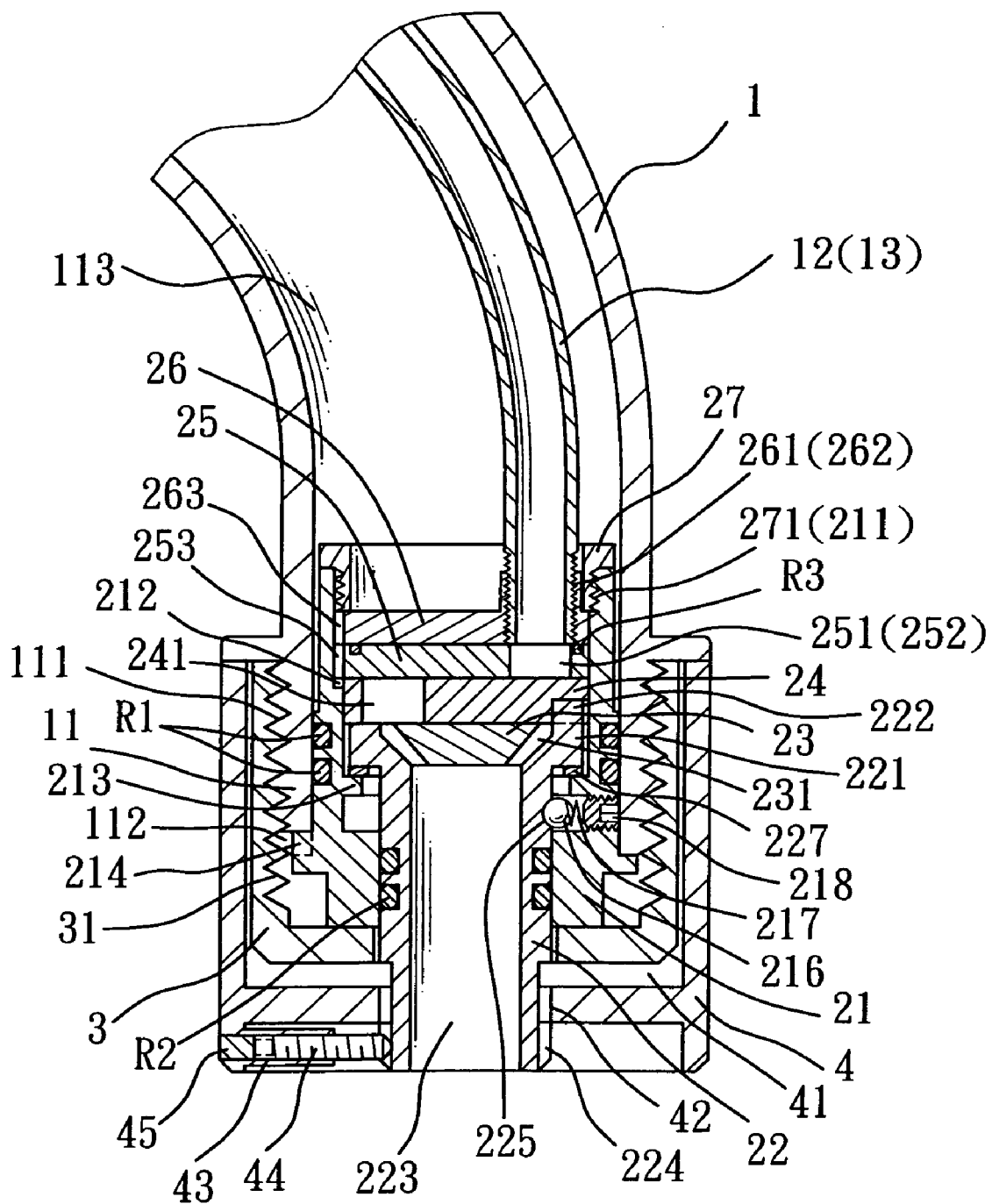
FIG. 3 is a sectional view of the invention.

Referring to FIGS. 1, 2 and 3, the water control structure according to the invention includes a water control valve assembly 2 installed on a spout 11 of a faucet body 1, and is fastened by a fastening sleeve 3, and encased by a rotary outer cap 4 to control opening and closing of water supply.

The spout 11 has an external screw thread 111, two notches 112 on the bottom side and a water passage 113 inside housing a cold water duct 12 and a hot water duct 13.

The water control valve assembly 2 includes a valve seat 21, a spindle 22, a buffer member 23, a ceramic movable plate 24, a ceramic anchor plate 25, a coupling member 26 and a fastening lid 27.

The valve seat 21 is a hollow barrel having one end with an internal screw thread 211 formed thereon, two flutes 212 on the inner wall, a flange 213 at about the middle portion, two lugs 214 on the outer side of the barrel to wedge in the notches 112 of the faucet body 1, a screw hole 215 running through the outer side to hold a steel ball 216, a spring 217 and a set screw 218 in this order. The barrel further has at least one annular groove 219 on the outer side to couple with one or more sealing washer R1.

The spindle 22 is housed in the valve seat 21 having a head 221 of a larger diameter on a upper side and a spline section 224 on a lower side, and a through hole 223 in the center. The head 221 may be latched on the flange 213 of the valve seat 21 and interposed by a Teflon washer 227 to reduce friction and wearing. The head 221 has two bosses 222 on the upper side. The through hole 223 is conical at the upper portion abutting the top edge. The spindle 22 further has a positioning dimple 225 on the outer side to couple with the steel ball 216. On a lower side of the spindle 22, there are two grooves 226 to couple with sealing washers R2.

The buffer member 23 is conical and located on the upper portion of the through hole 223 of the spindle 22, and has water inlets 231 formed on the periphery in an orderly manner to reduce the thrust of water flow.

The ceramic movable plate 24 is located in the valve seat 21 abutting the upper side of the buffer member 23 and has an arched water outlet 241, and two notches 242 on two sides of the bottom to couple with the bosses 222 of the spindle 22 so they can be moved together.

The ceramic anchor plate 25 is located in the valve seat 21 with the bottom surface abutting the upper side of the ceramic movable plate 24 and has two water intake ports 251 and 252 mating the water outlet 241 of the ceramic movable plate 24 to form a ceramic control valve A to control water flow. It has an annular groove 254 to hold a sealing washer R3. It also has two ridges 253 on the lateral side to couple on the flutes 212 of the valve seat 21 for anchoring.

The coupling member 26 is located in the valve seat 21 above the ceramic anchor plate 25, and has two ribs 263 on the lateral side to couple with the flutes 212 of the valve seat 21, and two coupling holes 261 and 262 to couple with the cold water duct 12 and hot water duct 13.

The fastening lid 27 is hollow and has an external screw thread 271 to engage with the upper side of the valve seat 21 to hold the elements mentioned above in the valve seat 21.

The fastening cap 3 is hollow and has an internal screw thread 31 on one end to engage with the external screw thread 111 of the spout 11 for fastening to the spout 11 of the faucet body 1.

The rotary outer cap 4 has a housing chamber 41, a spline opening 42 in the center to couple with the spline section 224 of the spindle 22 so that they can be moved together to control the water control valve assembly 2 to open or close water supply. There is a screw hole 43 on the bottom edge of the rotary outer cap 4 to couple with a screw 44 and a plug 45. The screw 44 has a distal end engaged with one side of the spline section 224 to anchor the rotary outer cap 4.

Figure 4:
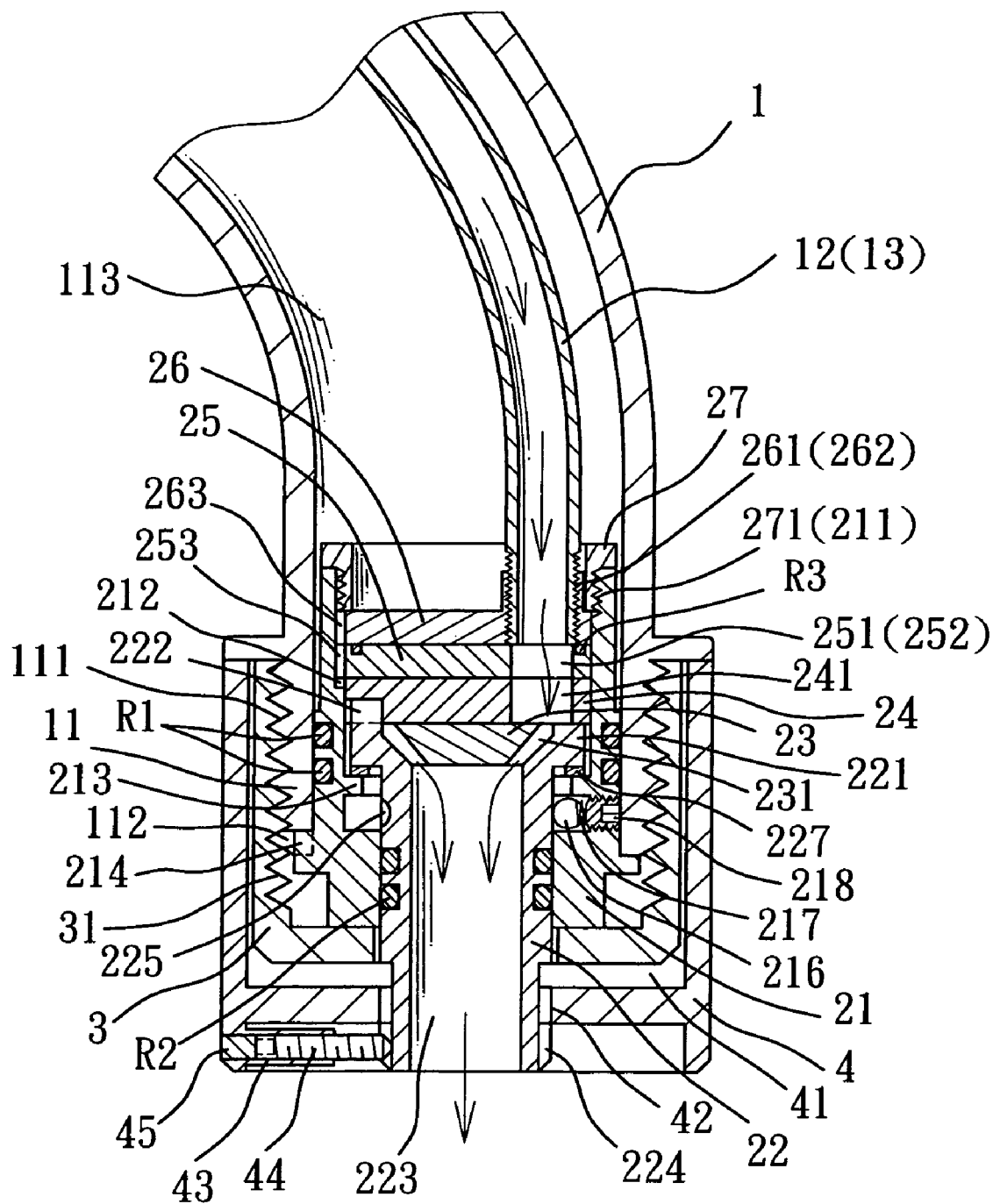
FIG. 4 is another sectional view of the invention.
Figure 5:
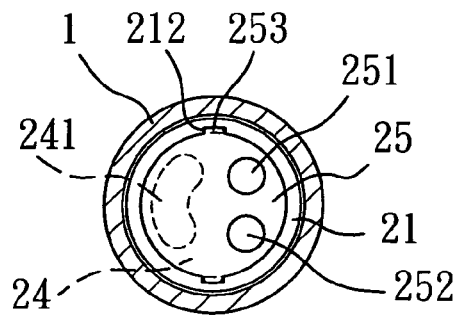
FIG. 5 is a schematic view of the invention showing the ceramic control valve in operating condition 1.
Figure 6:
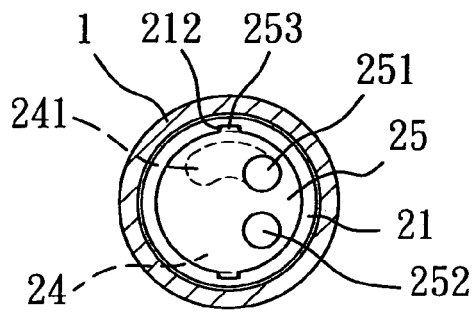
FIG. 6 is a schematic view of the invention showing the ceramic control valve in operating condition 2.
Figure 7:
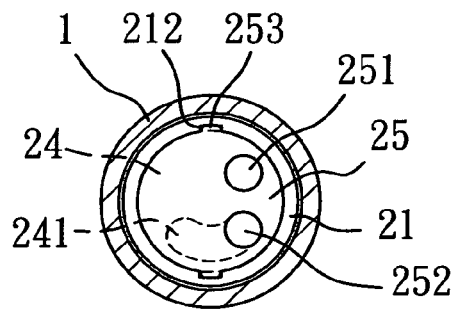
FIG. 7 is a schematic view of the invention showing the ceramic control valve in operating condition 3.
Figure 8:
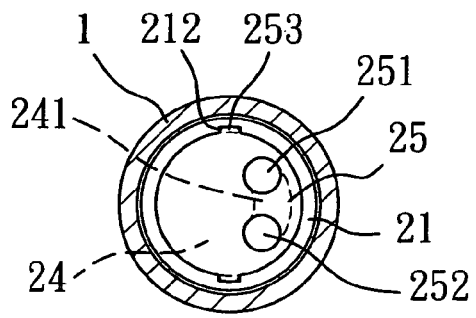
FIG. 8 is a schematic view of the invention showing the ceramic control valve in operating condition 4.

By means of the construction set forth above, water flows from the cold water duct 12 and hot water duct 13 of the spout 11 through the coupling holes 261 and 262 of the coupling member 26, and the water intake ports 251 and 252 of the ceramic anchor plate 25, the water outlet 241 of the ceramic movable plate 24, the water inlets 231 of the buffer member 23, and finally through the through hole 223 of the spindle 22 to outside (referring to FIG. 4).

Refer to FIGS. 5 through 8 for operation of the ceramic control valve A. When water flow is stopped, the water outlet 241 of the ceramic movable plate 24 is located on the opposite position of the water intake ports 251 and 252 of the ceramic anchor plate 25 so that the water cannot pass through the ceramic movable plate 24, and it is in a closing state (referring to FIG. 5).

To use the cold water or hot water, turn the ceramic movable plate 24 to align the water outlet 241 with one of the water intake ports 251 and 252 of the ceramic anchor plate 25. When the alignment is on the water intake port 251, cold water is supplied. When the alignment is on another water intake port 252, hot water is supplied (referring to FIGS. 6 and 7).

The invention can also supply cold water and hot water at the same time. For this purpose, turn the ceramic movable plate 24 to align the water outlet 241 with the water intake ports 251 and 252 at the same time, then cold water and hot water can flow out simultaneously (referring to FIG. 8).

To accurately control water supply, the screw hole 215 of the valve seat 21 can house the steel ball 216, spring 217 and set screw 218 in this order. And the spindle 22 has the positioning dimple 225 on the outer surface corresponding to the screw hole 215 to couple with the steel ball 216 to form an anchor condition (referring to FIG. 3).

I claim:

1. A water control structure for a spout of faucets comprising a water control valve assembly fastened to the spout of a faucet body through a fastening sleeve which is coupled by a rotary outer cap from outside to control opening and closing of water flow, wherein:

the spout has an external screw thread and a water passage located inside to house a cold water duct and a hot water duct;

the water control valve assembly includes:
  a valve seat being a hollow barrel and having an internal screw thread on one end, two flutes on an inner wall, and a flange located proximate to a middle portion thereof;
  a spindle housed in the valve seat having a head of a larger diameter on a upper side and a spline section on a lower side, and a through hole in the center, the head being latched on the flange of the valve seat and having two bosses on the upper side;
  a ceramic movable plate located in the valve seat having an arched water outlet and two notches on two sides of the bottom to couple with the bosses of the spindle;
  a ceramic anchor plate located in the valve seat having a bottom surface abutting a upper side of the ceramic movable plate and two water intake ports mating the water outlet of the ceramic movable plate to form a ceramic control valve to control water flow, and two ridges on a lateral side to couple with the flutes of the valve seat for anchoring;
  a coupling member located in the valve seat above the ceramic anchor plate having two ribs on a lateral side to couple with the flutes of the valve seat, and two coupling holes to couple with the cold water duct and the hot water duct; and
  a fastening lid being hollow and having an external screw thread to couple with a upper side of the valve seat to hold the elements set forth in the valve seat;
wherein the fastening sleeve is hollow and has an internal screw thread on one end to engage with the external screw thread of the spout;
wherein the rotary outer cap has a housing chamber, a spline opening in the center to couple with the spline section of the spindle to be moved together.

2. The water control structure of claim 1, wherein the spout has two notches on a bottom side to couple with two lugs formed on an outer side of the barrel.

3. The water control structure of claim 1, wherein the valve seat has a screw hole running through an outer side to hold a steel ball, a spring and a set screw, the spindle having an anchor dimple formed on the periphery corresponding to the screw hole to couple with the steel ball for anchoring.

4. The water control structure of claim 1, wherein the through hole in the spindle is conical on a upper portion abutting the top edge.

5. The water control structure of claim 1 further having a buffer member on a upper rim of the through hole of the spindle, the buffer member being conical and having water inlets formed on the peripheral edge in an orderly fashion.

6. The water control structure of claim 1 further having a Teflon washer interposed between the head of the spindle and the flange of the valve seat.

7. The water control structure of claim 1, wherein the rotary outer cap has a screw hole on the bottom edge to couple with a screw and a plug, the screw having a distal end engaged with one side of the spline section of the spindle.

* * * * *